Figure 16:
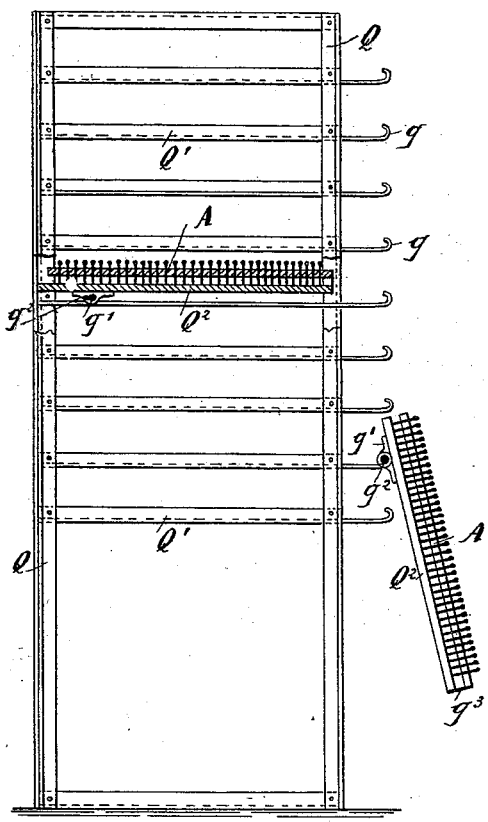

No. 610,357. Patented Sept. 6, 1898.
E. LAGNEAU.
MANUFACTURE OF MATCHES.
(Application filed Aug. 5, 1897.)
(No Model.) 7 Sheets—Sheet 1.
*Fig. 1* *Fig. 2.*
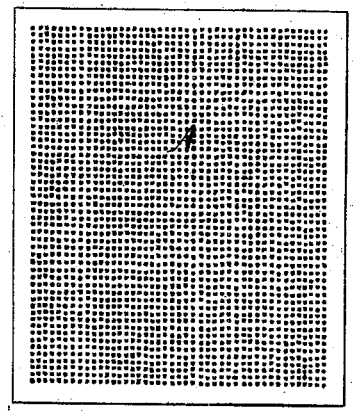
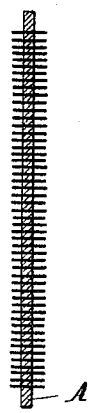
*Fig. 1ᵃ* *Fig. 2ᵃ*
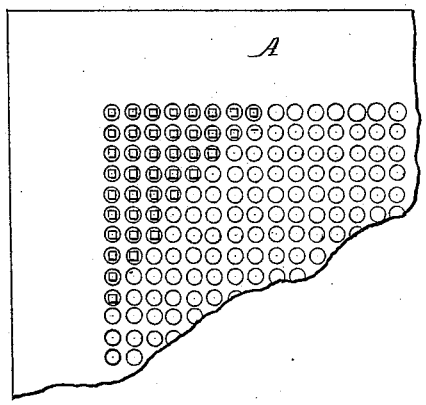
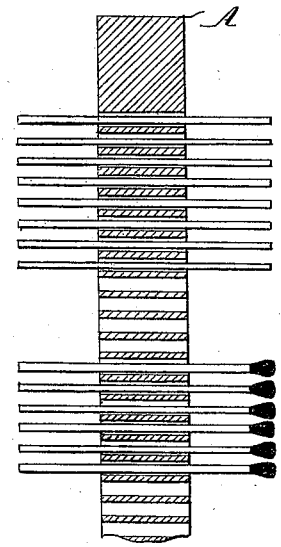
Witnesses:
Herbert Bradley
Fred R. Proctor
Inventor:
Emile Lagneau.
By Knight Bros
Atty's.

No. 610,357. Patented Sept. 6, 1898.
E. LAGNEAU.
MANUFACTURE OF MATCHES.
(Application filed Aug. 5, 1897.)
(No Model.) 7 Sheets—Sheet 2.
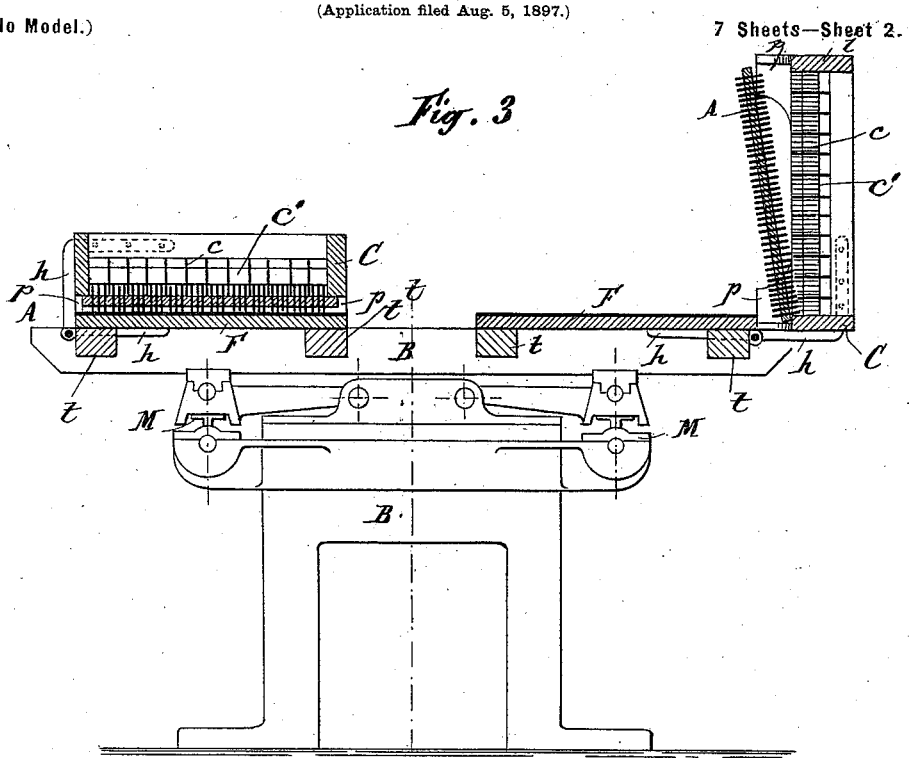
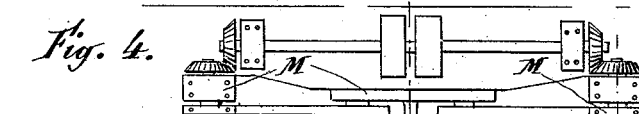
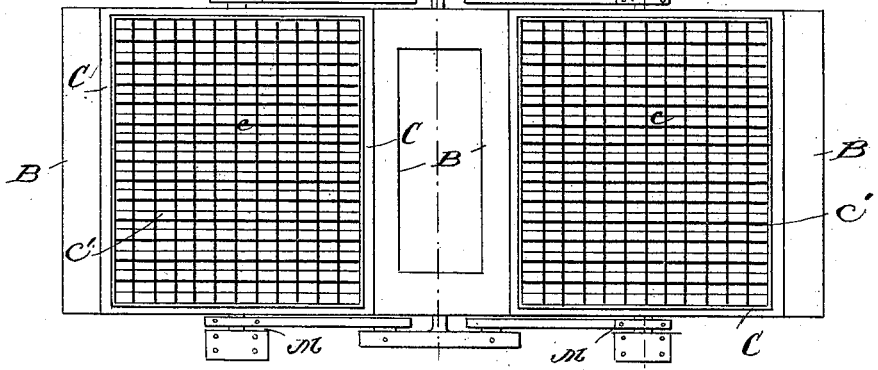
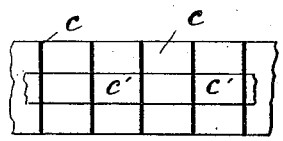 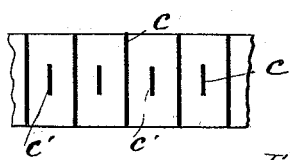
Witnesses:
Herbert Bradley
Fred R. Proctor
Inventor
Emile Lagneau.
By Knight Bros.
Attys.

No. 610,357. Patented Sept. 6, 1898.
E. LAGNEAU.
MANUFACTURE OF MATCHES.
(Application filed Aug. 5, 1897.)
(No Model.) 7 Sheets—Sheet 3.
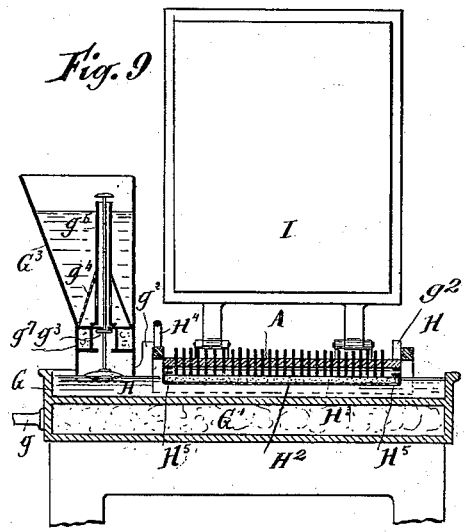
Fig. 9.
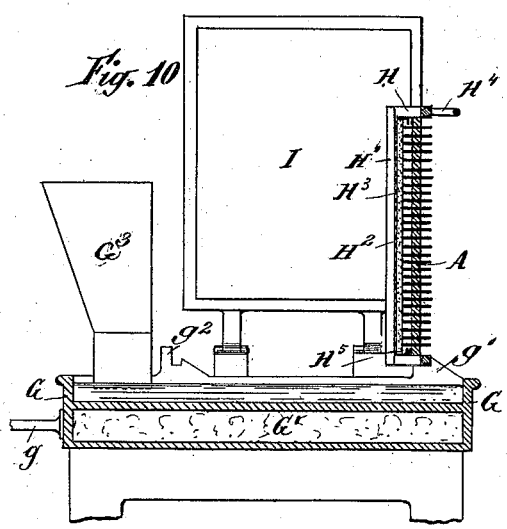
Fig. 10.
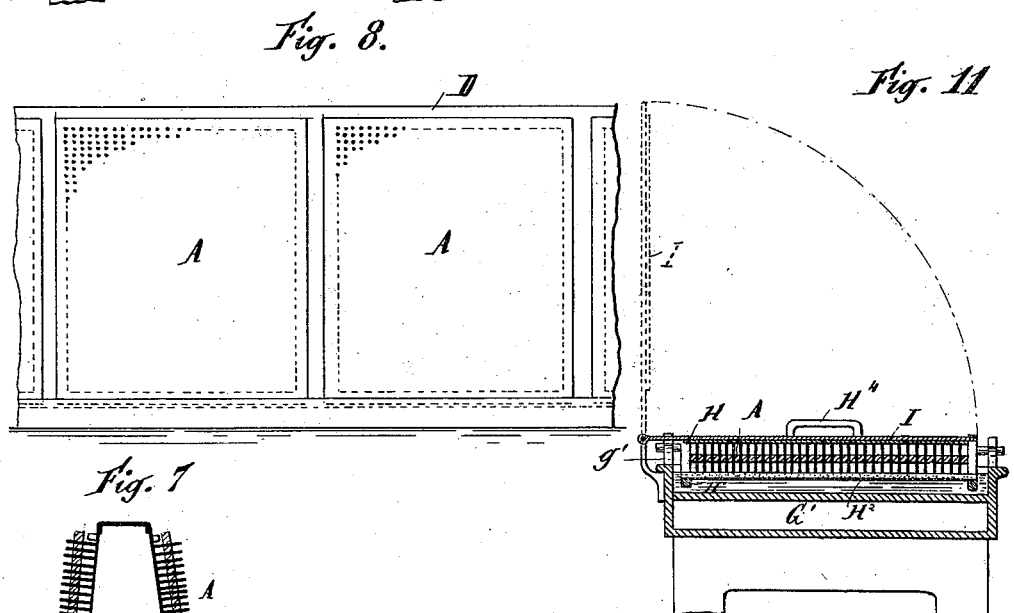
Fig. 8. Fig. 11. Fig. 12.
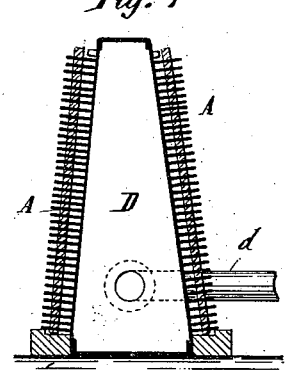
Fig. 7.
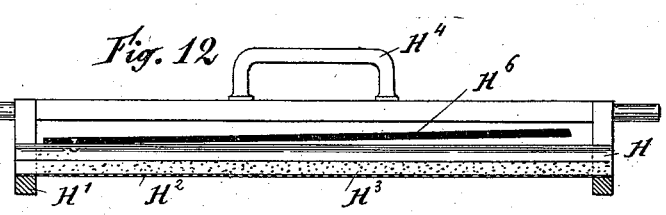
Witnesses:
Herbert Bradley
Fred R. Proctor
Inventor
Emile Lagneau
By Knight Bros
Attys.
THE NORRIS PETERS CO., PHOTO-LITHO., WASHINGTON, D. C.

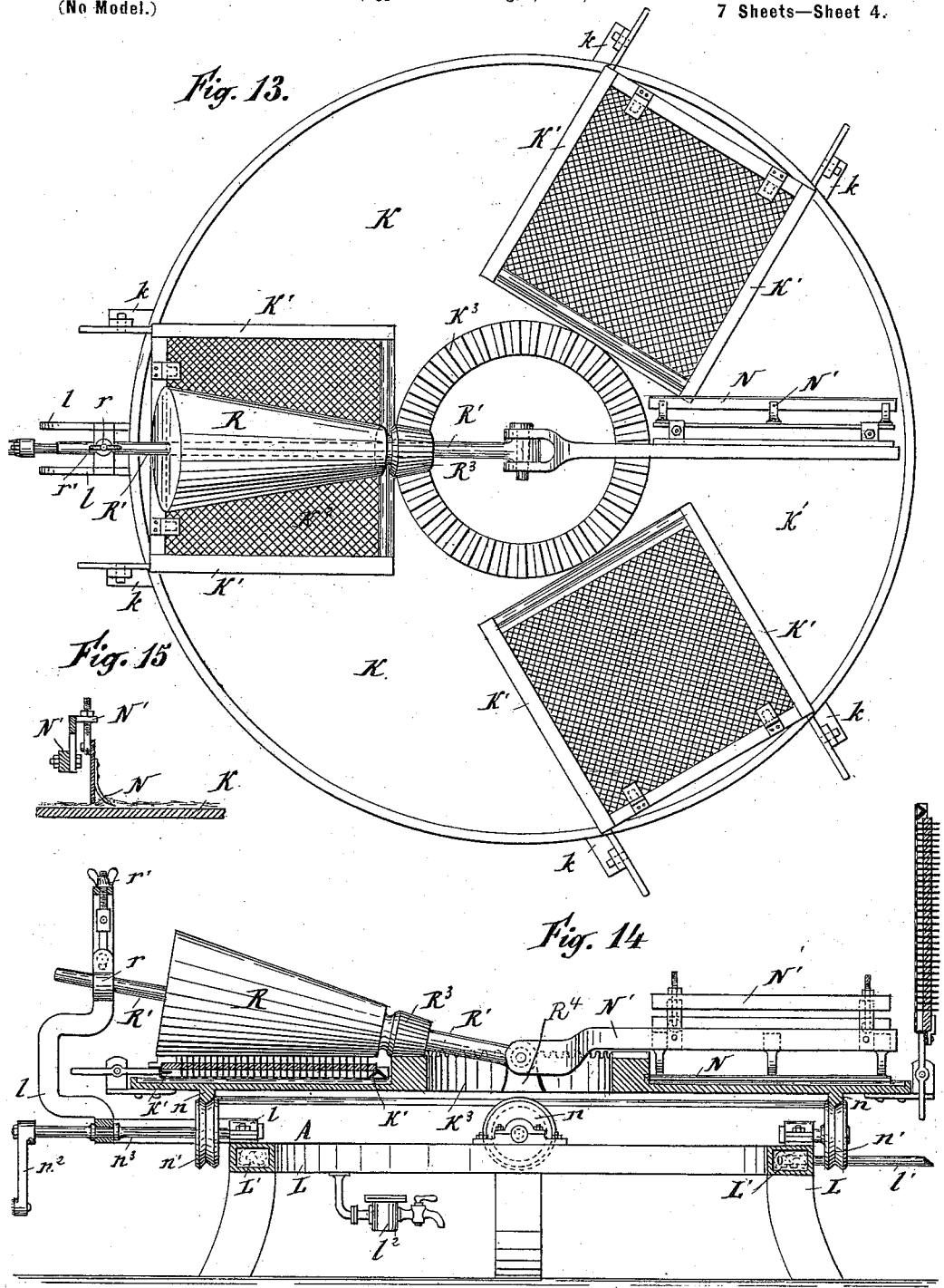

No. 610,357. Patented Sept. 6, 1898.
E. LAGNEAU.
MANUFACTURE OF MATCHES.
(Application filed Aug. 5, 1897.)
(No Model.) 7 Sheets—Sheet 5.

Witnesses:
Herbert Bradley
Fred R. Proctor

Inventor
Emile Lagneau
By Knight Bros
Attys.

THE NORRIS PETERS CO., PHOTO-LITHO., WASHINGTON, D. C.

No. 610,357. Patented Sept. 6, 1898.
E. LAGNEAU.
MANUFACTURE OF MATCHES.
(Application filed Aug. 5, 1897.)
(No Model.) 7 Sheets—Sheet 6.

Witnesses:
Herbert Bradley.
Fred R. Proctor.

Inventor
Emile Lagneau.
By Knight Bros
Attys.

No. 610,357. Patented Sept. 6, 1898.
E. LAGNEAU.
MANUFACTURE OF MATCHES.
(Application filed Aug. 5, 1897.)
(No Model.) 7 Sheets—Sheet 7.

Witnesses:
Herbert Bradley
Fred R. Proctor

Inventor:
Emile Lagneau
By Knight Bros.
Attys.

UNITED STATES PATENT OFFICE.

EMILE LAGNEAU, OF LESSINES, BELGIUM.

MANUFACTURE OF MATCHES.

SPECIFICATION forming part of Letters Patent No. 610,357, dated September 6, 1898.

Application filed August 5, 1897. Serial No. 647,183. (No model.) Patented in Belgium December 6, 1892, No. 102,418; in Switzerland December 19, 1892, No. 6,456; in England February 14, 1893, No. 3,267; in France March 27, 1893, No. 228,938; in Germany November 8, 1893, No. 73,450; in Norway December 4, 1893, No. 3,540; in Sweden December 7, 1893, No. 5,562; in Italy December 7, 1894, No. 37,774/130, and in Denmark March 3, 1897, No. 1,594.

*To all whom it may concern:*

Be it known that I, EMILE LAGNEAU, match manufacturer, a subject of the King of Belgium, and a resident of Lessines, in the Department of Hainaut and Kingdom of Belgium, have invented certain new and useful Improvements in Match-Making Apparatus, (for which I have obtained patents in Belgium, No. 102,418, dated December 6, 1892; in Switzerland, No. 6,456, dated December 19, 1892; in England, No. 3,267, dated February 14, 1893; in France, No. 228,938, dated March 27, 1893; in Germany, No. 73,450, dated November 8, 1893; in Denmark, No. 1,594, dated March 3, 1897; in Norway, No. 3,540, dated December 4, 1893; in Sweden, No. 5,562, dated December 7, 1893, and in Italy, No. 37,774/130, dated December 7, 1894,) of which the following is a specification.

My invention relates to improvements on the match-making apparatus described, shown, and claimed in my application, Serial No. 464,025, for Letters Patent which was filed February 28, 1893.

The apparatus for making matches hereinafter described allows of the green splints being inserted just as they come from the cutting apparatus, either directly or after the usual drying, into the frames, which are each formed of a plate perforated with holes, in which the splints are inserted and held loosely—that is to say, without any compression or gripping—the plate being made comparatively thick, so that the perforations are long enough to provide holes which encircle a considerable portion of the length of the splints, whereby the splints are retained with some stability in spite of the fact that they are free to move longitudinally, in order when the splints are suspended under these conditions in the holes of the frames to undergo successively all the necessary operations for their manufacture, so that when the splints are once inserted in the frames they are not removed therefrom except for the purpose of being boxed.

By treating the splints while loosely suspended in the frames—that is, without the necessity of any fixing devices—a great saving is effected in the manufacture, so that larger quantities of matches may be made in less time than by the processes of manufacture at present adopted, because the loose suspension of the splints allows of all the operations of dipping and withdrawing being effected more rapidly, while the said dipping is still effected in such a way that all the match-heads are uniform and shapely and each splint receives an equal quantity of paraffin and chemical paste.

My invention consists in the improved construction hereinafter described and claimed.

In order that my invention may be fully understood, I will proceed to describe it, with reference to the accompanying drawings, in which—

Figure 17:
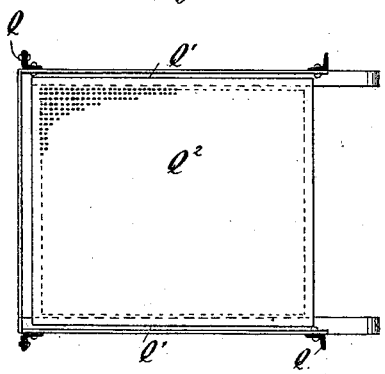
Figure 18:
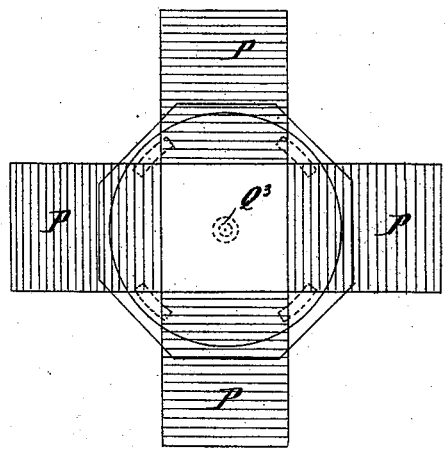
Figure 19:
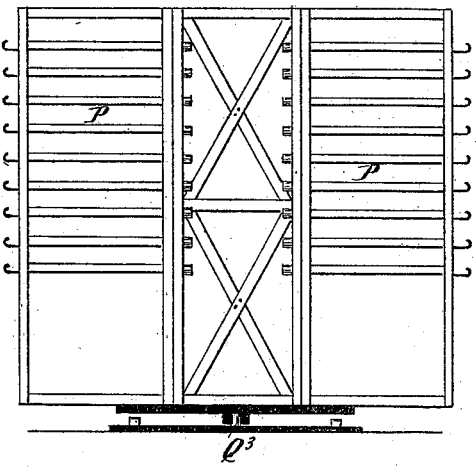
Figure 20:
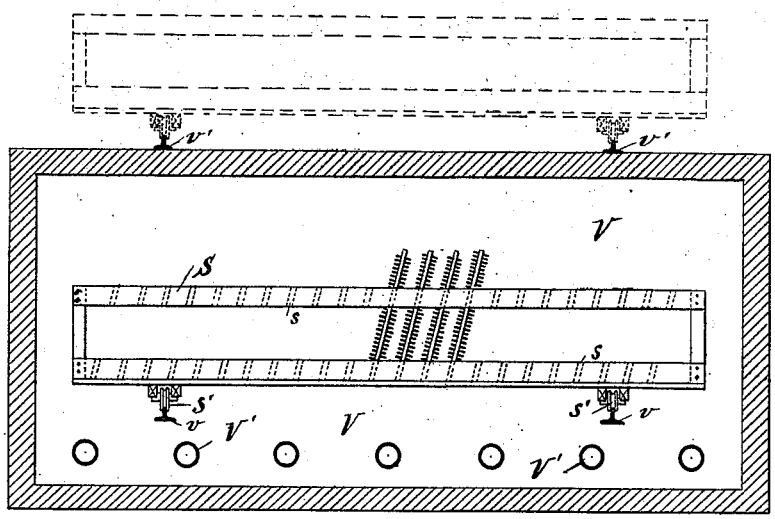
Figure 21:
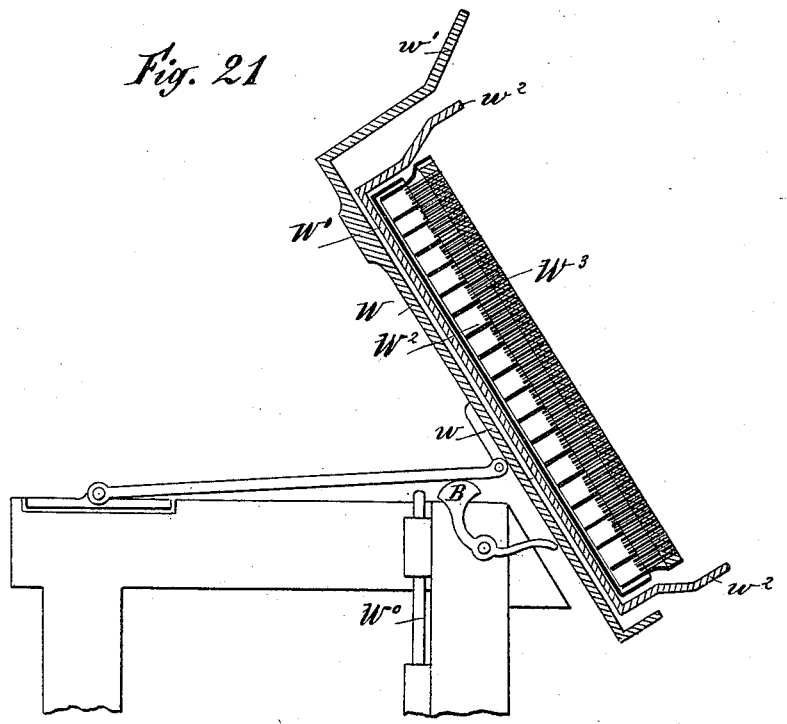
Figure 22:
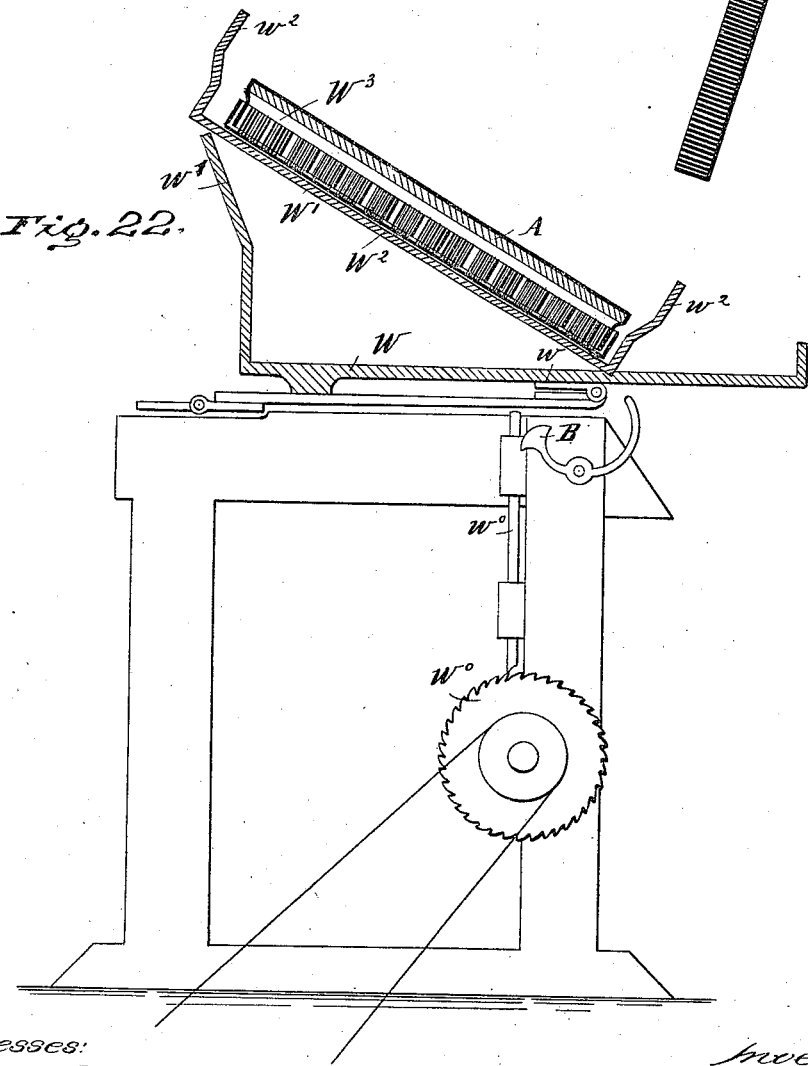
Figure 23:
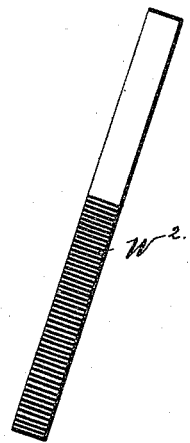

Figure 1 is a plan view of the frame or perforated plate; Fig. 2, a transverse section of the plate filled with splints. Figs. 1ª and 2ª are respectively views on a larger scale of portions of Figs. 1 and 2. Fig. 3 is a side elevation, partly in section, of the machine provided with pigeonholes for inserting the splints into the frame. Fig. 4 is a plan view of the same. Fig. 5 is a detail view showing a partly-vertical section of the arrangement of the pigeonholes. Fig. 6 is a transverse vertical section of this detail, taken on a line at right angles to that shown in Fig. 5. Fig. 7 is a vertical section of the vat for heating the splints before dipping them in paraffin. Fig. 8 is a detail view showing a side elevation of a part of this vat. Fig. 9 is a longitudinal section of the paraffin-dipping apparatus, the frame being in a horizontal position for the dipping and the pressing-down trap or cover plate raised. Fig. 10 is a partial section of the same, showing the dipping-frame in a raised position. Fig. 11 is a transverse section of the apparatus, showing the trap or cover plate laid down on the splints when being dipped. Fig. 12 is a front elevation of a detail of the dipping-frame with the bottom of the frame in section. Fig. 13 is a plan view of the apparatus for dipping the splints in the chemical paste, said apparatus having three frames. Fig. 14 is a transverse section of this apparatus, showing one of the frames under the chemical pressure-roller in a position for dipping and another frame in a raised position. Fig. 15 is a detail view showing a vertical transverse section of the paste-mixer with a part of the reservoir. Fig. 16 is a side elevation of a panel of the drying-frame for holding the dipped frames for equalizing the heads of the matches. Fig. 17 is a plan view of the same. Fig. 18 is a plan view of this drying device as a whole, and Fig. 19 is an elevation of the same. Fig. 20 is a vertical transverse section of the drying apparatus receiving the trucks loaded with frames filled with dipped splints. Fig. 21 is a side elevation of the table for removing the finished matches from the frames. Fig. 22 is a similar view showing accessory parts of the same. Fig. 23 is a sectional view of a trough or tray.

It must be first pointed out that the method of making matches by holding the splints quite loosely in perforated frames or plates A has the advantage of allowing the splints a certain amount of play in the holes in the frames, so that their ends may always be pressed exactly and uniformly against a common plane or bottom piece during the operation of dipping more particularly, and it is to this individual liberty of the splints that the great uniformity of manufacture is due, as will be hereinafter shown. In order, however, to allow of this arrangement of frames holding the splints loosely being employed without inconvenience—that is to say, without the splints being liable to fall out of the frames while the latter are being moved from a vertical to a horizontal position or vice versa—the retaining-plates of the machines, or in default of these special retaining-plates provided in the machines for holding the splints in the frames when they are in a horizontal position, are mounted on hinges in such a way as to maintain the splints in the frames also in the intermediate positions of inclination. When the frames are in a raised or vertical position, the splints rest horizontally in the holes, and the frames may be conveyed at will in this position without the least inconvenience, while, on the other hand, the arrangement for moving them downwardly in no way diminishes, but rather assists, the speed of the work.

The various apparatuses and operations of this method of manufacture will now be described.

*Placing in the frames.*—For this operation a double pigeonhole-framework having a shaking action is employed—that is to say, the machine supplies two splint-holding frames A at a time. It is operated by an ordinary shaking device M, Figs. 3 and 4, which need not be further described. The pigeonhole-framework, which as a whole is a known form of construction and consists of a rectangular square wooden frame C, the bottom of which is covered with small bottomless pigeonholes $c$, made of sheet metal and of about half the height of the wooden framework, comprises nevertheless an improvement, (shown on a larger scale in Figs. 5 and 6,) which improvement consists in dividing the pigeonholes $c$ in one direction by a partition $c'$ somewhat lower in height than their outside walls. This partition $c'$, which generally maintains better in position the splints inserted vertically in the pigeonholes, allows a freer displacement of their ends, with the object hereinbefore mentioned. At their sides the frames are provided with feet $p\ p$, with which they rest on cross-bars $t$ of the framework B of the machine while fitting into a bottom plate F, also placed on the cross-bars $t$, and are thus maintained below the pigeonholes $c$ at a distance equal to the height of these feet $p$, as shown in the left-hand side of Fig. 3. The framework C and the bottom plates F are secured on the framework B by hinges $h$, so as to allow of their being easily raised into a vertical position or lowered into a horizontal one, as shown in Fig. 3 at the right and left hand sides, respectively. The splints are inserted in the holes of the frames or perforated plates A, Figs. 1 and 1ª, in the following manner: The frames C are raised on their hinges $h$ into a vertical position and the frames A are fixed in the framework C against the pigeonholes. Then the whole is turned down on the bottom plate F, from which the frames A then stand at a little distance. The dried splints are then loaded into the upper part of the empty framework C and the shaking mechanism is set in action. Under this shaking action the splints enter endwise into the pigeonholes, where they cannot fall crosswise, owing to the little partitions $c'$, which force them to fall straight and to rest their ends on the frames, into the holes of which they penetrate under the shaking action, and as the middles of the said splints rest against the partitions $c'$ their lower ends are more easily displaced and more easily find the holes into which they are intended to penetrate. When the frames are filled, the whole framework C, including the frame A and the bottom plate F, is raised into a vertical position in order to prevent the splints from falling out of the frames when the latter are in the intermediate positions, and then the bottom plate F is turned down again and the frame A, filled with splints, is removed, as shown on the right-hand side of Fig. 3. The splints thus placed in the frame may then be dipped in paraffin; but, as is well known, in order that they may well absorb the paraffin the ends of the splints must be previously heated, so that the paraffin may act with the best effect during the operation of impregnation. This is effected in a very simple manner by placing the frames full of splints just as they have been removed from the shaking mechanism in contact for a given space of time with the walls of a trough or tank heated by steam. (Shown in Figs. 7 and 8.) This tank D is of special construction in so far as it forms a closed trapezium of sheet metal in which steam is admitted to the interior by means of a steam-pipe $d$, of any suitable length. The frames rest against the sheet-metal walls by reason of the inclined shape of the latter and the ends of the splints in contact with the said walls are rapidly heated.

*The paraffin-dipping.*—In the ordinary methods of manufacture this work always necessitates great precautions in order to avoid the splints being dipped too far along their length while still allowing their ends to be well impregnated. This improved method, on the contrary, allows of the dipping being effected by simply depressing or moving down the frame into the paraffining apparatus without any precaution whatever, owing to its peculiar arrangement, which will now be described, with reference to Figs. 9, 10, 11, and 12. It consists of a vessel with a double bottom, the upper compartment G of which is open and forms the paraffin-reservoir, while the lower compartment is closed on all sides and forms a steam-chamber $G'$, which is fed by a pipe $g$, the whole being placed on suitable supports. Brackets $g'$ are cast on the sides of the upper reservoir G, in which brackets one end of the dipping-frame H pivots, while the other end rests in similar brackets $g^2$ when the frame is lowered. A funnel $G^3$ for feeding in the paraffin is erected in front of the frame and is provided with a float-valve $g^3$, which automatically keeps the paraffin at a constant level in the reservoir G. In the center of the funnel a sheet-metal cylinder $g^5$ is fixed by means of a wire-gauze cone $g^4$, and the part of this cylinder inclosed by wire-gauze cone $g^4$ is perforated laterally. In this cylinder a rod $g^6$, which carries the valve of the float, is guided. The valve $g^3$ has sufficient play in an enlarged part of the bottom $g^7$ of the funnel to admit of the paraffin charged therein to pass round the cylinder $g^5$. By the admission of dry steam into the vat $G'$ the paraffin in the compartments G and $G^2$ and the funnel $G^3$ is then caused to melt and flows through the perforations of the cylinder and the valve, which is assumed to be open, into the dipping-vat, being filtered through the wire-gauze cone $g^4$, which retains all impurities, and in the said dipping-vat the level of the paraffin rises with the float until the valve of the latter closes the discharge-opening of the cylinder. As all the paraffin is kept in a thoroughly-liquid condition by the temperature of the steam, the quantity extracted from the reservoir at each dipping is replaced immediately and automatically, so that a thoroughly-uniform working is obtained without it being necessary to take the least precaution and without losing a second of time for this reason. The dipping-vat consists of a rectangular wooden framework H, on which is nailed or otherwise suitably fastened by means of an external frame $H'$ a bottom plate $H^2$ of perforated sheet metal, which is covered inside the vat with a sheet of felt or other similar porous material $H^3$. This porous sheet is of sufficient rigidity to remain quite flat and not to buckle up when the frame A with the splints is fitted over it, which is done in the following manner: The dipping-frame is withdrawn from the paraffin-bath by means of a handle $H^4$, fixed to the frame H, by causing it to pivot on the brackets $g'$ until it stands in a vertical position, Fig. 10. The frame A then rests against an internal shoulder $H^5$ of the framing H in such a way as to leave a certain interval between it and the bottom plate. A spring-strip $H^6$ is fixed on the shoulder at both sides of the holder at one end, and the frame A at the time of its insertion presses down this spring against the shoulder, so that it rests on the two springs when it is turned down into the paraffin-bath, the level of which has been readjusted in the meantime by the float-valve. The felt absorbs paraffin, which rises through the perforated plate, and the leveling plate or trap I is turned down onto the upper ends of the splints, which trap I pivots laterally on the basin, as shown in Figs. 9 and 11, and which, forcing the splints into the holes of the frame A, presses their lower ends uniformly on the felt sheet, where they are impregnated with paraffin with the greatest regularity. In order to then withdraw the splints saturated with paraffin, the dipping-case H is again raised into a vertical position; but the frame A is not immediately removed in the axial direction of the splints, because the latter might remain stuck in the felt and thus be drawn out of the frame A. In order to provide for this eventuality, the frame A is first drawn a little to one side, so as to release the splints from the felt, while the springs $H^6$ push away the frame, which may then be removed without the least inconvenience. Of course all these movements are made with great rapidity, so that the dipping of a frame of splints only requires at most a few seconds.

*Dipping the splints in the chemical paste.*—For this operation the precautions necessary with the appliances at present employed are still greater, while in this improved method it may be done without taking any extra precautions and also with the greatest rapidity and regularity and that by always turning down the frames containing the splints freely suspended onto suitably-constructed apparatus. Such apparatus may be made on the principle of the paraffining apparatus—that is to say, with a single dipping-frame—but the circular apparatus with three folding-down frames (shown in Figs. 13, 14, and 15) is preferable. This apparatus consists of an annular trough K, having a circular ridge $n$ cast on its lower side, which ridge has a triangular edge and rests in the grooves of a suitable number of pulleys $n'$, arranged around a corresponding circular frame or foundation L, so that the annular trough K may be set in rotation by means of a turn-table if one of the pulleys $n'$ be revolved by means of a handle $n^2$, the shaft $n^3$ of which is mounted in a suitable bracket $l$ of the support L. The upper ring L' of this support is hollow and serves as a receptacle for steam supplied by a pipe $l'$ from a suitable source. Below the chamber or receptacle there is a discharge arrangement $l^2$ of any suitable form of construction for the water of condensation. The chemical paste for forming the match-heads is spread in the shallow annular reservoir K, and it is maintained at the desired fluidity by the heat of the steam in the chamber L' radiating against the bottom. The dipping-frames, of which there are three to each reservoir, consist of simple iron frameworks K', having their bottom plates $K^2$ formed of perforated metal, but preferably of wire-gauze rigidly strained, the meshes of which break up and mix the paste when immersed therein. The frames K' pivot on brackets $k$, fixed on the outside of the reservoir, and it is evident that in order to dip the splints into the paste it suffices to place a frame, such as A, full of splints against a raised holder K' and then to lower or turn down the latter into the paste, which passes through the wire-gauze to the desired height to form the match-heads which dip therein, the gauze $K^2$ pressing flat on the bottom of the reservoir K. In this arrangement the splints are not pressed into the paste by means of a trap, but by a conical roller R, mounted on a spindle R', one end of which turns by a knuckle-joint at the center of the reservoir K on a fixed shaft $R^2$, mounted on a central bearing $R^4$, while the opposite end revolves in a bearing $r$, adjustable by means of a wing-nut $r'$ and screw in the upper part of the bracket $l$, with the object of enabling the roller to be arranged with its lower edge precisely parallel to the bottom of the paste-reservoir. A bevel-pinion $R^3$ is keyed in front of the conical roller R on the shaft R', the teeth of which pinion gear with those of the toothed circular rack $K^3$, cast on the paste-reservoir K. In this manner when the handle $n^2$ is turned in order to set the reservoir K in rotation the toothed rack $K^3$ revolves with it and sets in rotation the pinion $R^3$, which remains in its place and revolves the roller R, the periphery of which is covered with a sheet of india-rubber and travels on the upper ends of the splints projecting from the dipping-frames (which pass beneath the roller revolving with the basin K) and forces all the splints into the paste on the wire-gauze $K^2$ in such a way that each splint receives exactly the necessary amount of paste, whereupon they are withdrawn from the paste by raising the frame. In this manner three frames are dipped at once for one revolution of the reservoir, and after each revolution is thus accomplished a fresh quantity of paste equivalent to that removed by the splints is added to the reservoir and the fresh paste is thoroughly mixed with that remaining in the annular trough by means of a special agitator consisting of a blade N, inclined to the bottom of the trough or reservoir K and attached to a suitable frame N', also pivoted at the center of the reservoir on the shaft $R^2$. This blade being placed radially the paste will pass over it, being thoroughly mixed and rendered uniform, when the reservoir is revolved in such a way as to direct the paste against the inclination of the blade, Fig. 15, during which movement the frames K' are raised and receive the frames A for dipping a fresh quantity of splints.

*Equalizing the match-heads.*—When the frames are withdrawn from the dipping in the chemical paste, they must be kept for some time in a horizontal position in order that the head may be uniformly formed on the splint and may not accumulate at one side of the splint. For this object they are immediately conveyed to the drying frames or stage, Figs. 16, 17, 18, and 19. This frame, which is placed by the side of the chemical-paste-dipping apparatus, has four panels P, each consisting of four angle-iron uprights Q, connected at two sides by a series of horizontal angle-iron bars Q', placed one above the other, the ends of which project beyond the front side of the panel and are terminated by hooks $q$. Plates $Q^2$ rest on these bars Q', which thus form rails for moving them on, and have rods $q^2$ fixed to their lower sides in little brackets $q'$, so that if the plates $Q^2$ be drawn forward the rods $q^2$ engage the hooks $q$ and the plates fold down, being suspended almost vertically on the hooks. In this position a frame A, just withdrawn from the paste apparatus, is placed on the front edge $q^3$ in such a way that the match-heads are directed outward, and then the plates, with the frames A, are raised and pushed back into the panel with the match-heads uppermost, which heads set equally around the splints while they remain in the stand, and this lasts until all the panels are filled. When the revolving stand is turned on its central pivot $Q^3$ in order to bring its fourth panel into proximity to the chemical-paste apparatus, a second workman withdraws the plates from the first panel and turns them down in order to remove the frames A and place them at once transversely in a framework S, provided with grooves $s$, in which the frames are held, and these truck-frames S, which are provided with rollers $s'$, are pushed on a tramway $v$ into a drying apparatus V of the usual form of construction heated by steam circulating in pipes V', Fig. 20. When the trucks reach the opposite end of the drying apparatus to that at which they were inserted, the matches are quite dried, and the trucks are then raised by means of a lift or the like (which is not shown in the drawings, as any suitable device may be employed) and pushed along a tramway $v'$ (similar to the one $v$ already mentioned) along the cover of the drying apparatus and conveyed to a table, where the frames are discharged. The trucks and the drying apparatus have nothing particular about them, and therefore they are not described in detail. They are simply indicated to show the course of the operations.

*Discharging the frames.*—This last operation before the boxing of the matches consists in removing the frames from the trucks and piling them regularly in a simple rectangular box. The machine effecting this operation consists of a large tray W, arranged on a suitable stand provided with a shaking apparatus $W^0$ of any ordinary or suitable form of construction, so as to pivot on the edge of the frame by means of a hinge $w$. In this large trough or tray W a second similar one W' is placed, which holds in turn a little trough or tray $W^2$ for receiving the matches, in which tray there is finally placed a frame $W^3$ of simple pigeonholes, which is recessed on its upper side, this recessing being intended to receive the frame A which is to be emptied. The tray W has at its rear end a rest $w'$, and the tray W' handles $w^2$ at both ends, Figs 21 and 22.

The operation will now be easily understood. The whole is tilted on the front of the machine, as shown in Fig. 21, while the shaking mechanism is shut off in order that all may be stationary. The frames A withdrawn from the drying apparatus are then placed one after the other in the recess, with the match-heads toward the interior. The whole is then turned back horizontally on the machine and the shaking mechanism is set in operation until all the matches have fallen out of the frames A and fill the pigeonholes. The shaking mechanism is then again stopped, the tray W' is reared upon the support $w'$, and the pigeonholes-frame $W^3$ is gently withdrawn, so that the matches are pressed one against another in the little tray $W^2$, Fig. 22, which is then removed in order that the matches may be boxed, which is effected in any suitable manner.

Recapitulating all the operations, it is seen that the process is based on the use of simply perforated frames, in which the splints may be placed individually in order to be subjected to the various operations of treatment with an absolute uniformity without its being necessary to take any precautions, all the operations for fixing and equalizing the position of the splints which are necessary in the processes of manufacture hitherto employed and which require time and great care, and consequently only admit of the manufacture of a relatively small quantity of matches in a given time, being replaced in this improved method of manufacture by the simple alteration of the position of the frames from a vertical to a horizontal one, the vertical position being employed during the transportation of the frames, during which the splints are held in the frames by simply lying therein horizontally, while for the transference of the frames into a horizontal position which corresponds to the various phases of the treatment the machines are provided with bottom plates and auxiliary bottom plates for holding the splints while being treated. The most important application of these holding or supporting bottom plates is in the paraffin-dipping apparatus and the chemical-paste-dipping apparatus, which are the most delicate of the operations under any method of manufactures; but in this improved method of manufacture they are reduced to a simple lowering of the frames, while working with the greatest precision.

Having thus described my said invention, the following is what I claim as new therein and desire to secure by Letters Patent:

1. In a machine for making matches, in which the splints are held in frames simply perforated with holes, the combination of a suitable shaking mechanism with an auxiliary bottom plate, a pivoting-frame of pigeonholes, partitions dividing said pigeonholes in the center; but of less height than the sides of the pigeonholes, with the object of causing the splints to enter perpendicularly into the said pigeonholes and for facilitating the entrance of the ends of the splints into the holes in the frames, substantially as set forth.

2. In a machine for making matches, the combination of a dipping-tray having a fixed bottom of perforated metal covered with a sheet of porous felt, spring-bars on the sides of the tray on which the splint-holding frames rest, a paraffin-receptacle on which the tray pivots and in which it dips in order to saturate the felt, a paraffin-supply reservoir, a filtering-funnel and float-valve for automatically regulating the level of the paraffin, a steam-heated chamber under the reservoir for maintaining the paraffin in a fluid condition, and a folding flap pivoted on the frame of the paraffin-vat for pressing all the splints onto the saturated sheet of felt, the splint-holding frame remaining stationary and acting merely as a guide for the splints under the action of the flap, substantially as set forth.

3. In a machine for making matches, the combination of a rotary annular reservoir K, containing the chemical paste for forming the match-heads, one or more frames K' having a wire-gauze bottom and pivoted on the framework of the reservoir K so as to allow of the paste passing through the porous bottom to a certain height when the frames are dipped in the said paste, a rotary roller R for pressing all the splints in a frame into the paste, means for setting this roller in rotation as the reservoir passes beneath it, means for adjusting said roller, a device for mixing the paste, pivoted in the center of the apparatus, and comprising an inclined blade raising and mixing the paste when turned down, means for rotating the said reservoir, and an annular steam-chamber beneath the reservoir for keeping the paste fluid, substantially as shown and set forth.

4. In a machine for making matches, the means for equalizing the match-heads, comprising a revoluble drying-frame with wings having horizontal bars, on which plates Q² are placed supporting the splint-holding frames A, said plates engaging with hooks at the ends of the bars in such a way as to allow of the said plates being suspended vertically therefrom, substantially as shown and set forth.

5. In a machine for making matches, means for discharging the splint-holding frames, comprising several trays fitting one in the other, the innermost of which receives a frame of pigeonholes and this latter the splint-holding frame which is to be discharged, the whole pivoting on a stand provided with a shaking apparatus; substantially as shown and set forth.

In testimony whereof I have signed my name to this specification in the presence of two subscribing witnesses.

EMILE LAGNEAU.

Witnesses:
AUG. JOERISSEN,
GREGORY PHELAN.